(No Model.)

G. F. BUSS.
DADOING MACHINE.

No. 345,668. Patented July 20, 1886.

WITNESSES
Charles A Renwick
Fred N. Stevens.

INVENTOR
George F Buss
By his Attorney
Edward Taggart

UNITED STATES PATENT OFFICE.

GEORGE F. BUSS, OF GRAND RAPIDS, MICHIGAN.

DADOING-MACHINE.

SPECIFICATION forming part of Letters Patent No. 345,668, dated July 20, 1886.

Application filed June 13, 1885. Serial No. 168,653. (No model.)

*To all whom it may concern:*

Be it known that I, GEORGE F. BUSS, a citizen of the United States, residing at the city of Grand Rapids, in the county of Kent and State of Michigan, have invented certain new and useful Improvements in Dadoing-Machines, of which the following is a specification.

My invention relates to a dadoing-machine provided with two or more cutter-heads adjustably attached to a shaft, with automatically-moving carriage for supporting the stock to be operated upon; and the object of my invention is to facilitate and cheapen the cutting of dado grooves, which object I accomplish by means of the mechanism illustrated in the accompanying drawings, in which—

Figures 1, 2:
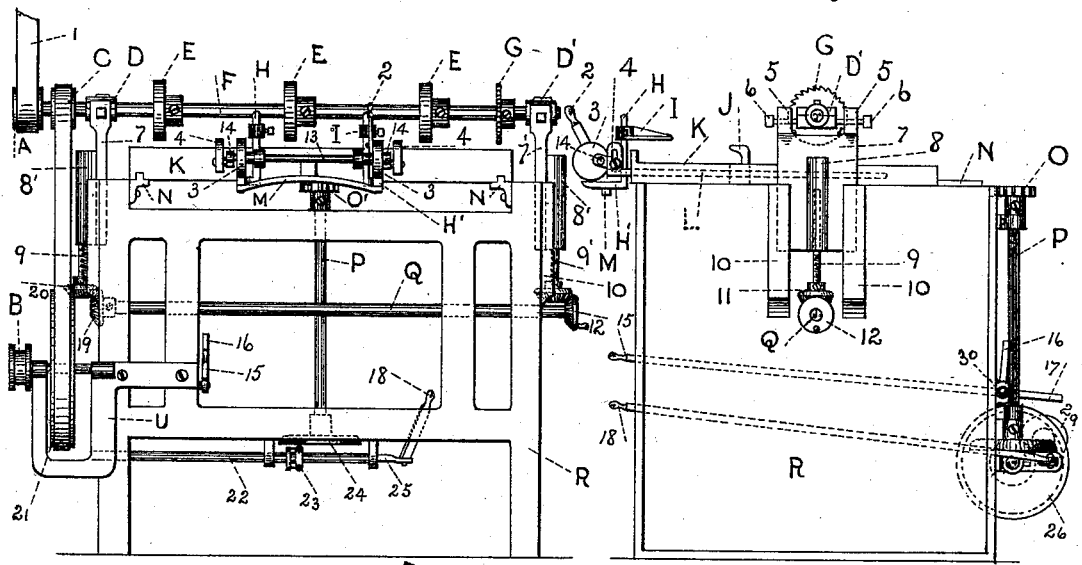
Figures 3, 4:
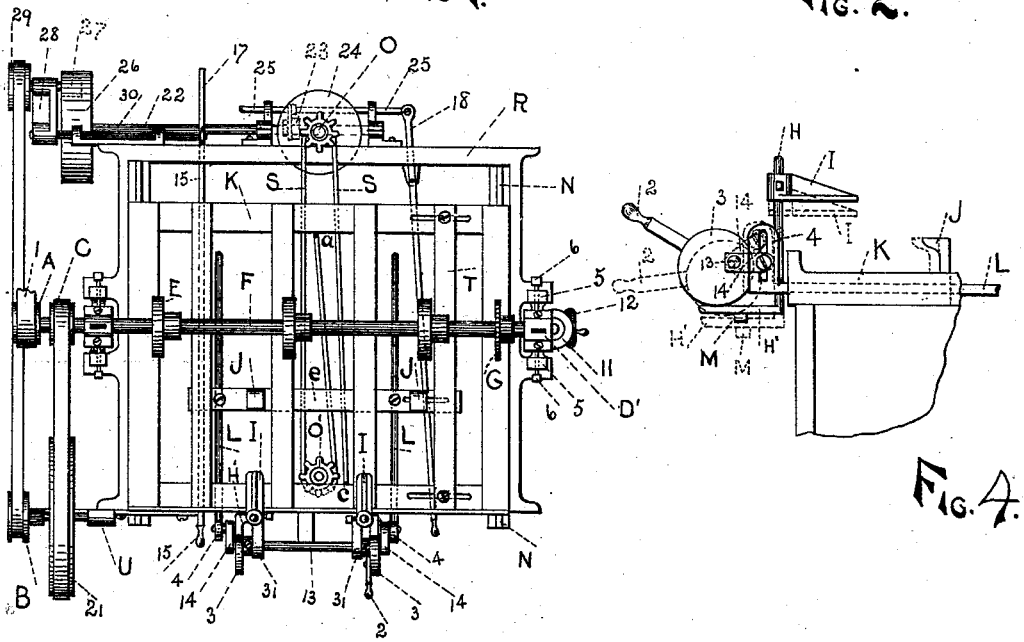

Figure 1 is a front elevation of my dadomachine. Fig. 2 is a side elevation of the same. Fig. 3 is a plan view, and Fig. 4 is a side view, of the clamping-mechanism which holds the stock on the machine in position to be operated upon by the cutter-heads.

Similar letters refer to similar parts throughout the several views.

The power is conveyed to the machine by means of belt 1 which passes around the pulley A. The pulley A is rigidly attached to the shaft F, upon which shaft are the cutter-heads E E E. The cutter-heads are attached to the shaft in such a manner as to revolve with it, and may be adjusted to and from each other. The shaft F is supported in the journal-boxes D and D'.

G is a cut-off saw attached to and revolved by said shaft F. The shaft F, with the parts thereto attached, is adjustable vertically, so as to adapt the machine to stock of various thicknesses and grooves of greater or less depth. The method of adjusting the shaft F vertically is shown in Fig. 2.

7 and 7' are slides moving in the ways 10 10. Each way is provided with the female screw 8 and screw-bolt 9. At the lower end of the bolt 9 is the bevel gear-wheel 11, which engages with the bevel gear-wheel 12. By turning the wheel 12 the screw-bolt 9 is revolved and the journal-boxes of the shaft F raised and lowered. The shaft Q connects the bevel-gear at one end of the shaft with a similar gear at the other end, so that boxes D and D' are raised and lowered simultaneously. The journal-boxes D and D' are also adjusted horizontally, the method of such adjustment being shown fully in Fig. 2.

5 5 are two lugs or ears upon the slide 8, between which lugs is the journal-box held in place by set-screws 6 6, by means of which the journal-box is adjusted horizontally. By tightening one screw and loosening the other, the journal-box may be moved to or from either lug.

R is the frame-work of the machine.

K is a sliding table, which moves to and from the cutter-heads on the ways N N. The table K has longitudinal bars, one of which, T, has a lateral adjustment in order to adapt the table to stock of different lengths.

O and O' are sprocket-wheels, O being rigidly attached to the upper end of shaft P. The chain S is attached at one end to the table K at $a$, and passes around sprocket-wheel O', thence around sprocket-wheel O, and then forward to the point C, where the other end of the chain is attached to the frame of the carriage, as shown fully in Fig. 3. The revolution of the shaft P and sprocket-wheel O, alternately in one direction and then in the other, gives the reciprocating motion to the table K. The power is conveyed from pulley C by a belt to pulley 21, which pulley is on the same shaft as belt-pulley B. Pulley B is connected by a belt to pulley 29, which is attached to the shaft which revolves the internal pulley, 27, both being supported by the arm 28, rigidly attached to the shaft 30.

26 is a friction-wheel rigidly attached to the shaft 22, and provided with a circular groove of sufficient width to receive the pulley 27. The shaft 22 is provided with the lever 15, by means of which the shaft 30 may be turned a short distance or revolved a short distance, so as to bring the friction-pulley 27 in contact with outer surface of the groove in 26. When the shaft revolves the friction-pulley 26 in one direction, and when it is turned so as to bring the friction-pulley in contact with the inner side of the groove in 26, it revolves the pulley rapidly in the opposite direction. The pulleys B and 21 are supported by the yoke U. The shaft 22 has a rigid attachment to the pulley 26, so that both revolve together.

23 is a friction-pulley keyed to shaft 22, so as to revolve with it, but so as to be moved along the shaft backward and forward, and it is connected by a bar or rod to lever 18.

24 is a friction-wheel rigidly attached to the shaft P. Friction-wheel 23 is in contact with the lower surface of wheel 24 and conveys motion to it, which motion is regulated by moving wheel 23 toward and from the center of wheel 24 by means of the rod 25 and lever 18. By bringing the internal friction-wheel, 27, in contact with the outer edge of the groove in wheel 26 the sprocket-wheel O is set in motion by means of the connecting mechanism above described, and the table is moved slowly toward the cutter-heads, and by bringing the internal friction-wheel 27 in contact with the inner side of the groove in wheel 26 the table is moved rapidly in the opposite direction. The movement of the table may be increased or lessened at any time by moving the friction-wheel 23 to or from the center of the friction-wheel 24. The moving of the internal friction-wheel, 27, may be done automatically by the movement of the table, the table or a projection therefrom striking against arm 16.

The stock to be operated upon is placed upon table K and held by means of the clamping device shown, which I intend to make the subject of another application.

L is a bar provided with the link 4 and also with the horizontally-moving jaw J.

13 is a shaft, to which are rigidly attached the eccentrics 3 3.

2 is a handle attached rigidly to the eccentric or shaft.

14 is a crank-lever attached rigidly to the shaft and provided with a pin which moves in link 4.

H is the support for the vertically-moving jaw I, the lower bent part, H', resting against the spring M and the upper part of H' resting against the eccentric 3. The stock being placed on the table, the handle 2 is pressed downward, when the jaw J is moved against the edge of the stock, and jaw I drawn down upon it from above, thereby clamping the stock from two directions and holding it securely in position.

Having thus described my invention, what I claim to have invented, and desire to secure by Letters Patent, is—

1. The combination, in a dadoing-machine, of a driving-shaft adjustable vertically and longitudinally, carrying adjustable cutter-heads, a table moved by power transmitted from the constantly-rotating driving-shaft, and intermediate mechanism, substantially as described, by which said table is reciprocated backward and forward without affecting the motion of the driving-shaft, as set forth.

2. In a dadoing-machine, the combination of the adjustable driving-shaft, the adjustable cutter-heads thereon, the reciprocating table, sprocket-wheel O and O', the belt S, connected to the table and also to the stationary frame of the machine, the pulley 26, the adjustable friction-pulley 27, and the shafts 22 and P, whereby the table is reciprocated without affecting the constant rotation of the driving-shaft and cutter-heads, substantially as described.

GEO. F. BUSS.

Witnesses:
FRED W. STEVENS,
ARTHUR C. DENISON.